J. C. Osgood,
Hawse Holes.
N°16,992.   Patented Apl. 7, 1857.
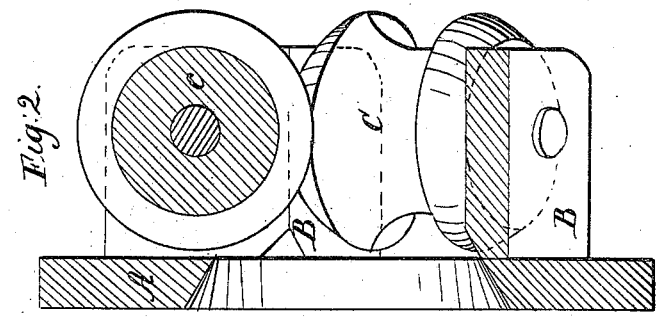
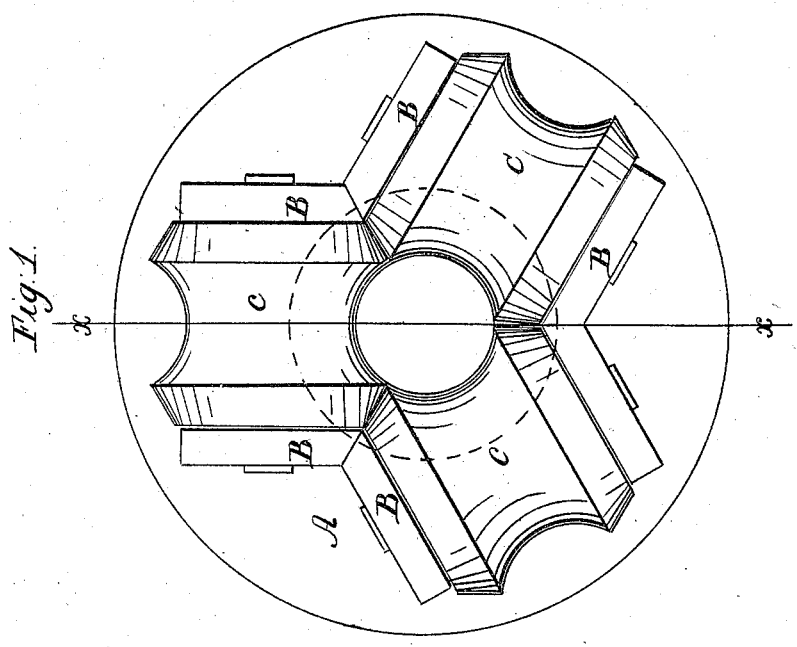

UNITED STATES PATENT OFFICE.

JASON C. OSGOOD, OF TROY, NEW YORK.

HAWSE-HOLE FOR VESSELS, &c.

Specification of Letters Patent No. 16,992, dated April 7, 1857.

*To all whom it may concern:*

Be it known that I, JASON C. OSGOOD, of Troy, in Rensselaer county and State of New York, have invented certain new and useful Improvements in Hawse-Holes for Vessels and other Like Purposes; and do hereby declare that the following is a full, clear, and exact description thereof, reference being had to the accompanying drawing, through letters of reference marked thereon, forming part of this specification, and in which—

Figure 1, represents a front view of my invention, and Fig. 2, a section on the line $x$ $x$ of Fig. 1.

The same letters of reference occurring in each figure indicate like parts.

In the construction of hawes holes or pulley guides, for ropes or chains to pass through so that they may be led in and out at varying angles, I am aware that a series of pulleys or disks have been arranged in a circle meeting each other at their edges, so as to present a rolling surface, in any portion of the circumference of the hole formed by them, but which have all been defective, inasmuch as their sharp edges only come in contact with each other, which are very soon worn or chipped off, when they chafe and wear the rope or chain very rapidly.

The nature of my invention therefore consists, in beveling the edges of the pulleys so as to fit against each other, whereby a right or slightly obtuse angled edge is formed to them no matter what number may be arranged around the circle, which gives additional strength and at the same time is not calculated to cut or chafe the rope or chain as the acute angle formed by their merely touching at the edges would be.

To enable others to make and use my invention I will describe its construction and operation.

(A) represents an annular plate on which are a series of projections (B) arranged in lines parallel to and equidistant on either side of radius lines and at right angles to said plate, to form supports for the trunnions of the pulleys (C), the concave peripheries of which correspond with the arc of the circle they are intended to surround, equal in length to one-third, one-fourth, or any proportion thereof corresponding with the number of pulleys to be used, the edges of which are beveled to an angle corresponding with radius lines between them dividing the circle inclosed into the same number of equal parts, so that the beveled edge of one pulley abuts against that of the next in close contact with each other all around the circle. The greater the number of pulleys the greater the angle at which the cable may be fed or led off; for all ordinary purposes however 3 or 4 will be found to be sufficient.

This arrangement is particularly applicable for conducting the chain or rope of a swinging crane such as is used in some dredging machines or for floor guides for the ropes of hoisting machinery for warehouses and many like purposes.

Having thus described my invention I do not claim arranging a series of pulleys in a circle, but

What I do claim as new and desire to secure by Letters Patent is—

Beveling the edges of the pulleys in the manner and for the purposes substantially as herein specified.

In testimony whereof I hereunto subscribe my name.

J. C. OSGOOD.

Witnesses:
W. LESKI,
WM. M. SMITH.